A. MARTINOICZ.
ROTARY MOTION MECHANISM.
APPLICATION FILED MAR. 6, 1920.
1,350,106.  Patented Aug. 17, 1920.
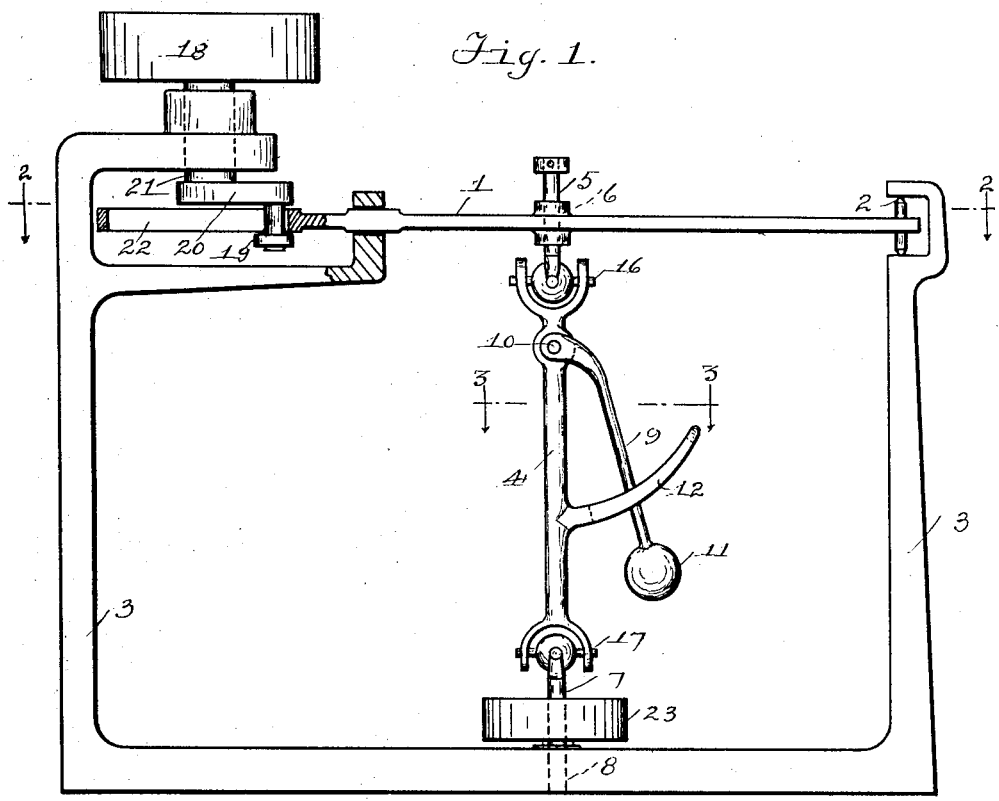
Fig. 1.
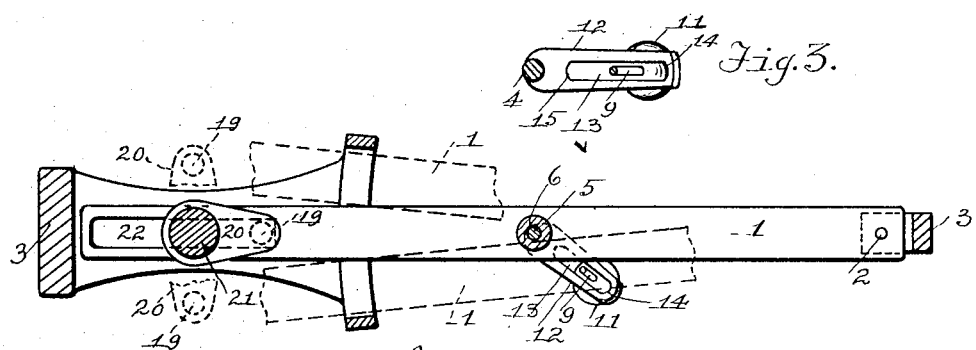
Fig. 3.
Fig. 2.
Witness:
Geo. L. Chapes
Inventor
Adolph Martinoicz
By Cyrus W. Rice
his Attorney

UNITED STATES PATENT OFFICE.

ADOLPH MARTINOICZ, OF MUSKEGON, MICHIGAN.

ROTARY-MOTION MECHANISM.

1,350,106.  Specification of Letters Patent. Patented Aug. 17, 1920.

Application filed March 6, 1920. Serial No. 363,700.

*To all whom it may concern:*

Be it known that I, ADOLPH MARTINOICZ, a citizen of Poland, residing at Muskegon, in the county of Muskegon and State of Michigan, have invented new and useful Improvements in Rotary - Motion Mechanism, of which the following is a specification.

The present invention relates to rotary motion mechanism, and its object is to provide an improved mechanism of that character; a further object is to provide means for effecting a novel mechanical movement.

These and any other objects appearing hereinafter are attained by, and the invention finds preferable embodiment in, the structure hereinafter particularly described and illustrated by the accompanying drawings, in which:—

Figure 1 is a side view of rotary motion mechanism;

Fig. 2 is a sectional view of the same taken on a plane corresponding to line 2—2 of Fig. 1; and Fig. 3 is a sectional view of parts of the same taken on a plane corresponding to line 3—3 of Fig. 1.

In the embodiment of the invention chosen for illustration by the drawings and for detailed description in the body of this specification, the arm 1 is swingably mounted, as at 2 on the frame 3, in such manner as to rock sidewise and in an approximately vertical plane an upright member 4 which is rotatably mounted, as by having its upper journal portion 5 freely rotatable in a vertically disposed bearing 6 in the arm 1, and by having its lower journal portion 7 freely rotatable in a vertically disposed bearing 8 in the lower part of the frame 3. In the construction shown this arm 1 swings in a horizontal plane. A second arm 9 is carried by the member 4, being pivoted thereto at 10 so as to swing in an approximately vertical plane. This arm 9 is weighted at 11 adjacent its lower end, and its swinging movement may be limited by the guide member 12 slotted at 13 and having stops 14, 15. In the construction shown, the journal portion 5 at the upper end of the member 4 is not only rotatably but also longitudinally-slidably held in the bearing 6 in the arm 1. Suitable universal joints, as Hooke's joints 16, 17 serve to connect the member 4 with its upper and lower journal portions 5 and 7 respectively. The swinging movement of the arm 1 may be effected in various ways, as by the power-conveying pulley 18, the wrist pin 19 of the crank 20 on the pulley's shaft 21 engaging in the slot 22 in the arm 1. A pulley 23 may be employed to convey motion from the rotatable member to desired driven mechanism.

It will be seen that the swinging of the arm 1 back and forth will quickly impart to the member 4 a rotary movement by reason of the momentum such swinging imparts to the weight 11; that as the speed of such rotary movement increases, the weight swings under the influence of centrifugal force outwardly farther from said member, its momentum thus imparting steadiness to such rotary movement; that the weight 11 travels in an elliptical path rather than in a circle, the major axis of which path (except as modified by the weight's acquired momentum) being in the approximately vertical plane in which the member 4 is rocked by the arm 1; that this elliptical movement results in variations of the force and speed which at different parts of the weight's travel are imparted to the pulley 23, and utilizable in various driven mechanisms wherein the same may be desirable.

It will be understood that the arm 1 may be mounted in various ways to effect the sidewise rocking of the member 4 in a vertical or approximately vertical plane; and that if the bearings 6 and 8 are loose enough the member 4 and its journal portions 5 and 7 may be formed integrally.

The invention being intended to be pointed out in the claims, is not to be limited to or by details of construction of the particular embodiment thereof shown by the drawings or hereinbefore described.

I claim:

1. In mechanism of the character described; a swingable arm; means for swinging the arm; an approximately upright rotatable member rotatably connected to the arm; a weighted arm connected at its upper end to said member swingably in an approximately vertical plane.

2. In mechanism of the character described; a swingable arm having a vertically disposed bearing; means for swinging the arm; an approximately upright rotatable member having a journal portion rotatable and longitudinally movable in said bearing; a weighted arm connected at its upper end to said member swingably in an approximately vertical plane.

3. In mechanism of the character described; a swingable arm having a vertically disposed bearing; means for swinging the arm; an approximately upright rotatable member having a journal portion rotatable in said bearing and connected to said member by a universal joint; a weighted arm connected at its upper end to said member swingably in an approximately vertical plane.

4. In mechanism of the character described; a swingable arm having a vertically disposed bearing; means for swinging the arm; an approximately upright rotatable member having at its upper end a journal portion rotatable in said bearing and connected to said member by a universal joint, and having at its lower end a journal portion connected to said member by a universal joint and rotatable in a vertically disposed bearing; a weighted arm connected at its upper end to said member swingably in an approximately vertical plane.

5. In mechanism of the character described; an arm swingable in an approximately horizontal plane; an approximately upright rotatable member rotatably connected to the arm; a weighted arm connected at its upper end to said member swingably in an approximately vertical plane.

6. In mechanism of the character described; a swingable arm; an approximately upright rotatable member rotatably connected to the arm; a weighted arm connected at its upper end to said member swingably in an approximately vertical plane.

In testimony whereof I have hereunto set my hand at Grand Rapids, Michigan, this 2nd day of March, 1920.

ADOLPH MARTINOICZ.